April 21, 1953

R. L. VANCE 2,636,128

PHOTOELECTRIC DEVICE

Filed Oct. 27, 1950

INVENTOR
R.L. VANCE
BY
ATTORNEY

Patented Apr. 21, 1953

2,636,128

UNITED STATES PATENT OFFICE 2,636,128

PHOTOELECTRIC DEVICE

Robert L. Vance, Springtown, Pa., assignor to Bell Telephone Laboratories, Incorporated, New York, N. Y., a corporation of New York Application October 27, 1950, Serial No. 192,393

6 Claims. (Cl. 250—214)

This invention relates to photoelectric devices and more particularly to the mounting and assembling of a plurality of elements in a compact unit for a photoelectric device.

In certain applications of photoelectric devices, such as in a card translator of the types disclosed in Patent No. 2,558,577, issued June 26, 1951, to O. Myers and the application of E. W. Gent and O. Myers, Serial No. 784,024, filed November 4, 1947, a plurality of light-sensitive elements must be mounted closely together in accurate alignment. As more fully disclosed in the above-mentioned copending applications, the translation is accomplished by means of a large number of thin cards of a magnetic material, each of which cards has a series of perforations punched through it. In the operation of such a device, a first series of pulses entering the device causes apparatus to pick one or more of the cards from the stack thereby causing a particular alignment of the perforations or apertures through which some form of energy passes registering this distinctive pattern on means responsive to the energy source placed adjacent each row of apertures at the end of the translator removed from the energy source. In one advantageous embodiment of such a translator, the energy employed is light and the energy responsive means are photosensitive elements. Because of the long path that the light traverses from the source is going through the apertures in a large number of cards which are positioned in a row, it is desirable that the photosensitive element be accurately positioned adjacent the last aperture in axial alignment with the row of apertures in order that the maximum amount of energy will impinge on the light-sensitive element.

Such photosensitive elements, however, have a very high impedance and for this and other reasons more fully set forth in the application of B. F. Lewis and K. H. Muller, Serial No. 192,590, filed October 27, 1950, it is desirable to seal the photosensitive element together with other circuit elements within an evacuated and roughly pencil-shaped container. The container is advantageously of a low-reluctance magnetic material and has positioned therein amplifying circuit means; thus the leads that are brought out from the container have a low impedance thereby obviating the possibility of variations in the leakage between the high impedance terminals of the photosensitive element or the leads therefrom due to the moisture content of the atmosphere. This further enables the connecting leads from the photosensitive element to be a minimum length. Also the container provides a magnetic shielding for the internal circuit elements.

Such a container is provided with the window at one end through which the light may enter. In order to attain accurate and rapid translation, it is desirable that a maximum of the light impinge directly on the photosensitive element. It is therefore desirable that the window in the end of the photosensitive element be positioned closely adjacent the container window, that the two windows be parallel, and further that the photosensitive device be axially aligned with the container window.

This, however, is further complicated because of the delicate nature of photosensitive elements, such as would be used for these purposes, in that it is advantageous not to expose them to any unnecessary heating such as would be required for brazing or welding connections and supports to them.

It is therefore one object of this invention to accurately position and support a photosensitive element within an enclosed photoelectric device.

It is a further object of this invention to provide electrical connections to the photosensitive element without securing the connections to this element by any heating process but so that the electrical connections also serve to position the photosensitive element accurately within the photoelectric device.

These and other objects of this invention are achieved in one specific embodiment in which a photosensitive element is positioned within the container of a photoelectric device by means of spring contact and mount assemblies cooperating with the external anode and cathode terminals of the photoelectric device. In this specific embodiment, the spring contact and mount assembly for the cathode terminal comprises a tab surrounding the cylindrical terminal, insulating collar sections encompassing the tab and a spring wire forcing the collar sections to bear against the tab and terminal, electrical connections being made to the tab. The insulating sections have an external diameter to accurately position the window end of the photosensitive element within the container. The spring contact and mount assemblies for the anode in turn comprise a spring jack into which the cylindrical anode terminal fits and which is also concentrically held within the container by insulating discs supporting the spring jack and bearing against the cylindrical container wall.

It is therefore one feature of this invention that a photosensitive element be supported within a photoelectric device by spring and contact assemblies making electrical contact with the terminals of the photosensitive element.

It is a further feature of this invention that the spring and contact assemblies themselves concentrically position the photosensitive element within the cylindrical container, or cylindrical end thereof, by bearing against the internal cylindrical walls.

A complete understanding of this invention and of the various features thereof may be gained from consideration of the following detailed description and the accompanying drawing in which.

Figure 1:
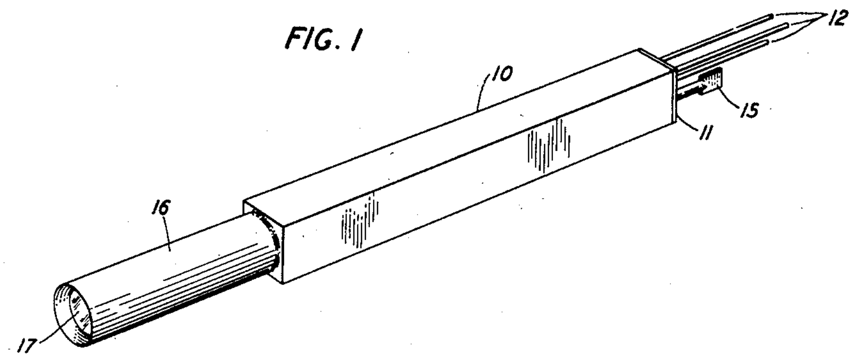
Fig. 1 is a perspective view of a photoelectric device.

Referring now to the drawings, the container for the photoelectric device comprises a square sectional casing 10 having a base 11 through which leads 12 extend, the leads being insulated from the base by bushings or seals 13. An exhaust tubulation 15 is also provided in the base for evacuating the container. A cylindrical casing 16 having a window 17 at the opposite end of the device from the base 11 completes the container.

Figure 2:
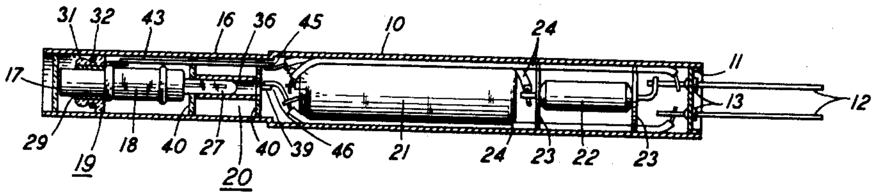
Fig. 2 is a sectional view of the device of Fig. 1 showing the internal elements thereof and the mounting of the photosensitive element in accordance with one specific embodiment of this invention.

Within this container, as seen in Fig. 2, are positioned in tandem a photosensitive element 18 which may advantageously be a photosensitive cell of the caesium antimony type, positioned and supported by spring contact and mount assemblies 19 and 20, in accordance with the invention, an amplifying tube 21, and a condenser 22, which may be advantageously be of the ceramic type. The condenser is supported and positioned by insulating discs 23, as of mica, and the disc 23 and the tube 21 are in turn held and positioned within the container 10 by the insulating leads 24 extending in the corners of the square sectioned container 10 and interconnecting the various internal elements of the photoelectric device and the external leads 12.

Figure 4:
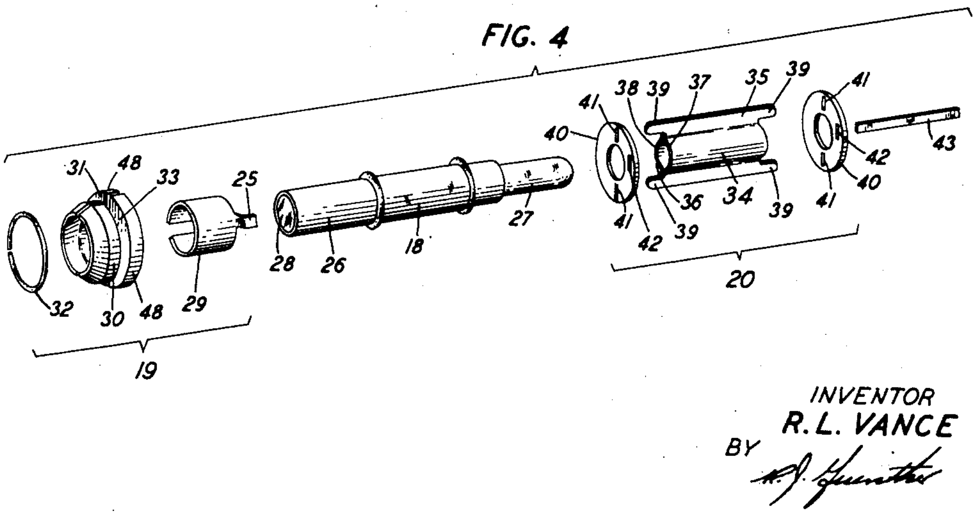
Fig. 4 is an exploded perspective view of the spring contact and mounting assemblies for the photosensitive element.

As best seen in Fig. 4, the photosensitive element or cell 18 is provided with external cathode and anode terminals 26 and 27, respectively, and an end window 28 sealed to the cathode terminal 26. A metallic collar or tab 29 fits over the cathode terminal 26 and the split collar sections 30 and 31 of an insulating material in turn fit over the tab 29. A wire spring 32 sits on a ledge 33 on the split collar sections 30 and 31 and forces the tab 29 into intimate electrical contact with the cathode terminal 26. The tab 29, split collar members 30 and 31 and the spring ring 32 comprise the spring contact and mount assembly 19 and also aid in aligning the photosensitive element accurately within the device as explained further below.

Figure 3:
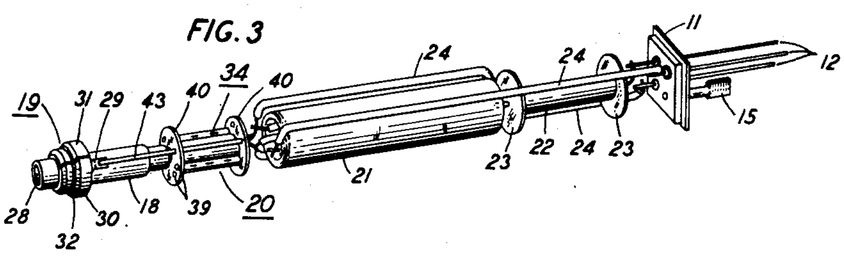
Fig. 3 is a perspective view of the internal elements of the device of Fig. 1.

Anode terminal 27 in turn fits into and is supported by the spring contact and mounting means 20 which comprises a spring jack 34 including two metallic members 35 and 36 each having a semicircular portion 37 and 38, respectively, biased towards each other, between which semicircular portions the terminal 27 is inserted. Each of the members 35 and 36 of the spring jack 34 is also provided with end tabs 39. Insulating discs 40 have apertures 41 and 42 therein, the tabs 39 extending through the apertures 41, and being bent over, as best seen in Fig. 3, to support the spring jack 34.

The strip 43 extends through the apertures 42 in the insulating discs 40 and is secured as by welding to an end tab or tail 25 on the cylindrical tab or collar 29. A connection from the cathode of the photosensitive element directly to the amplifying tube which assures low leakage to other elements is thus attained. Connections between the two terminals of the photosensitive element 18 and the other internal and external circuit elements are thus made by one of the leads 24 secured to the strip 43 as at 45 and another 24 being secured to one of the tabs 39 on either member 35 or 36 as at 46.

Referring back to Fig. 2, as best seen there are the two spring contact and mount assemblies 19 and 20 not only provide electrical contact between the anode and cathode terminals of the photosensitive element and the other elements of the circuit but also accurately position the photosensitive element within the cylindrical casing 16 of the container so that the windows 17 and 28 are parallel to each other and a maximum of light is collected to impinge on the photosensitive element. Thus, the collar members 30 and 31 have their outer surfaces 48 of such a diameter that on being tightly held together by the spring 32, which also biases the conducting tab 29 in intimate electrical connection with the terminal 26, the collar members 30 and 31 exactly fit within the casing 16. Similarly, the disc members 40 have an external diameter exactly equal to the internal diameter of the cylindrical casing 16. By means of these spring contact and mount assemblies angular variation in the position of the photosensitive element within the device is thus prevented.

It is to be understood that the above-described arrangements are illustrative of the application of the principles of the invention. Numerous other arrangements may be devised by those skilled in the art without departing from the spirit and scope of the invention.

What is claimed is:

1. A photoelectric device comprising an elongated container, a plurality of terminal leads sealed at one end of said container, a glass window sealed at the other end of said container, a photosensitive cell positioned in said container adjacent said window and having anode and cathode terminals, circuit means in cooperative relation with said cell to relay information received from said cell, said circuit means being positioned in said container adjacent said cell, and means electrically connecting said circuit means, said cell, and said terminals, said last-mentioned means including a first spring contact and mounting means bearing against the anode terminal of said cell and a second spring contact and mounting means bearing against the cathode terminal of said cell, said each spring means including alignment means accurately axially positioning said cell in said container adjacent said window.

2. A photoelectric device comprising an elongated container, one end of said container being cylindrical, a window at said one end, a photosensitive cell in said one end adjacent said window, said cell having cylindrical cathode and anode terminals at opposite ends thereof, a first spring contact and mount assembly in contact with said cathode terminal positioning said terminal, said assembly comprising tab means in contact with said cathode terminal, alignment means surrounding said tab means and said cathode terminal, and spring means encompassing said alignment means and forcing said tab means into intimate electrical contact with said cathode terminal, said alignment means fitting closely within said one end of said container to position said cell adjacent said window, a second spring contact and mount assembly in contact with said anode terminal, circuit means in said container in cooperative relation with said cell, and means connecting said spring contact and mount assemblies and said circuit means in circuit arrangement.

3. A photoelectric device in accordance with claim 2 wherein said second spring contact and mount assembly comprises a pair of insulating discs and a pair of conductive members positioned between said discs and mounted thereby, each of said members having a semicircular center portion, said anode terminal being positioned between said semicircular center portions and forcing them apart.

4. A photoelectric device comprising an elongated container, one end of said container being cylindrical, a window sealed at said one end, a photosensitive cell in said one end adjacent said window, said cell having cylindrical anode and cathode terminals, a cylindrical contact tab surrounding said cathode terminal, an insulating collar encompassing said tab, a spring ring encompassing said insulating collar and forcing said contact tab into intimate electrical contact with said cathode terminal, said collar fitting closely within said cylindrical end of said container to accurately axially align said photosensitive cell adjacent said window, a spring jack comprising a pair of conductive members having central semicircular portions, said anode terminal fitting between said semicircular portions and forcing said members apart, and a pair of insulating discs supporting said spring jack, said insulating discs fitting closely within said cylindrical end of said container to accurately axially position said cell.

5. A photoelectric device comprising an elongated evacuated container having a circular cross-section at its one end, a glass window sealed in said container at said end, a plurality of terminal leads insulatingly sealed in the other end of said container, a photosensitive cell in said container adjacent said window, capacitance means in said container adjacent said terminals, a gaseous discharge device in said container between said cell and said capacitance means, said cell having cylindrical anode and cathode terminals, a thin cylindrical contact tab surrounding said cathode terminal, a split collar surrounding said contact tab and having its outer periphery bearing against the inner wall of said circular end to position said cell adjacent said window, a spring ring encompassing said split collar and forcing said contact tab into intimate electrical contact with said cathode terminal, a spring contact and mount assembly in intimate electrical contact with said anode terminal, and a plurality of insulated leads electrically connecting said cylindrical contact tab, said spring contact and mount assembly, said gaseous discharge device, said capacitance means and said terminals in circuit arrangement.

6. A photoelectric device in accordance with claim 5 wherein said spring contact and mount assembly comprises a pair of insulating discs and a pair of conductive members having their edges secured together and having central semicircular portions, said anode terminal fitting between said semicircular portions and forcing them apart, said conductive members being supported by said discs, said discs bearing against the inner wall of said cylindrical end of said container to position said cell, and one of said insulated leads being connected to one of said conductive members.

ROBERT L. VANCE.

References Cited in the file of this patent

UNITED STATES PATENTS

| Number | Name | Date |
|---|---|---|
| 1,546,264 | Story | July 14, 1925 |
| 1,988,505 | Morandini et al. | Jan. 22, 1935 |
| 2,322,022 | Hewitt | June 15, 1943 |
| 2,493,919 | Holmes | Jan. 10, 1950 |
| 2,544,554 | Holmes | Mar. 6, 1951 |